UNITED STATES PATENT OFFICE.

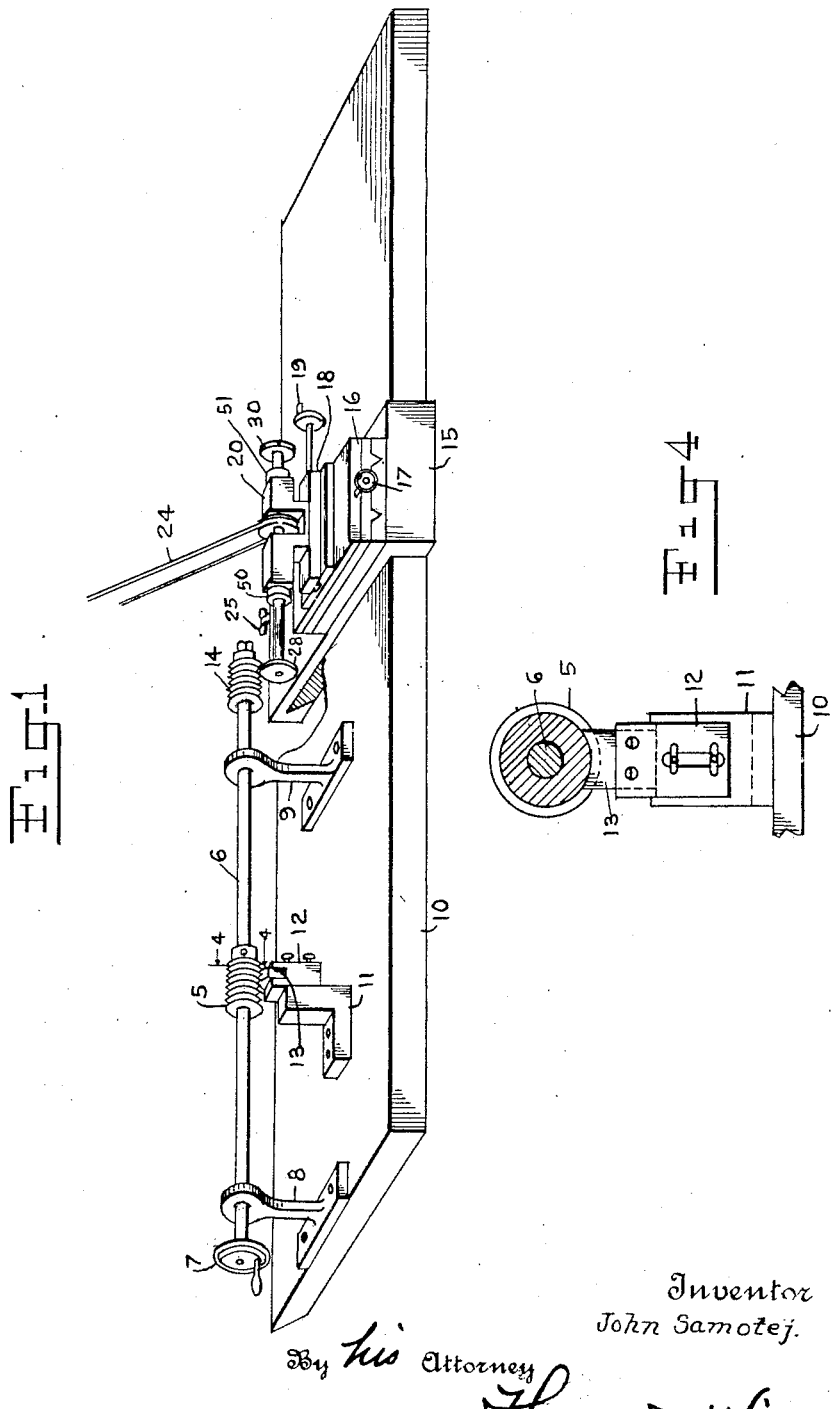

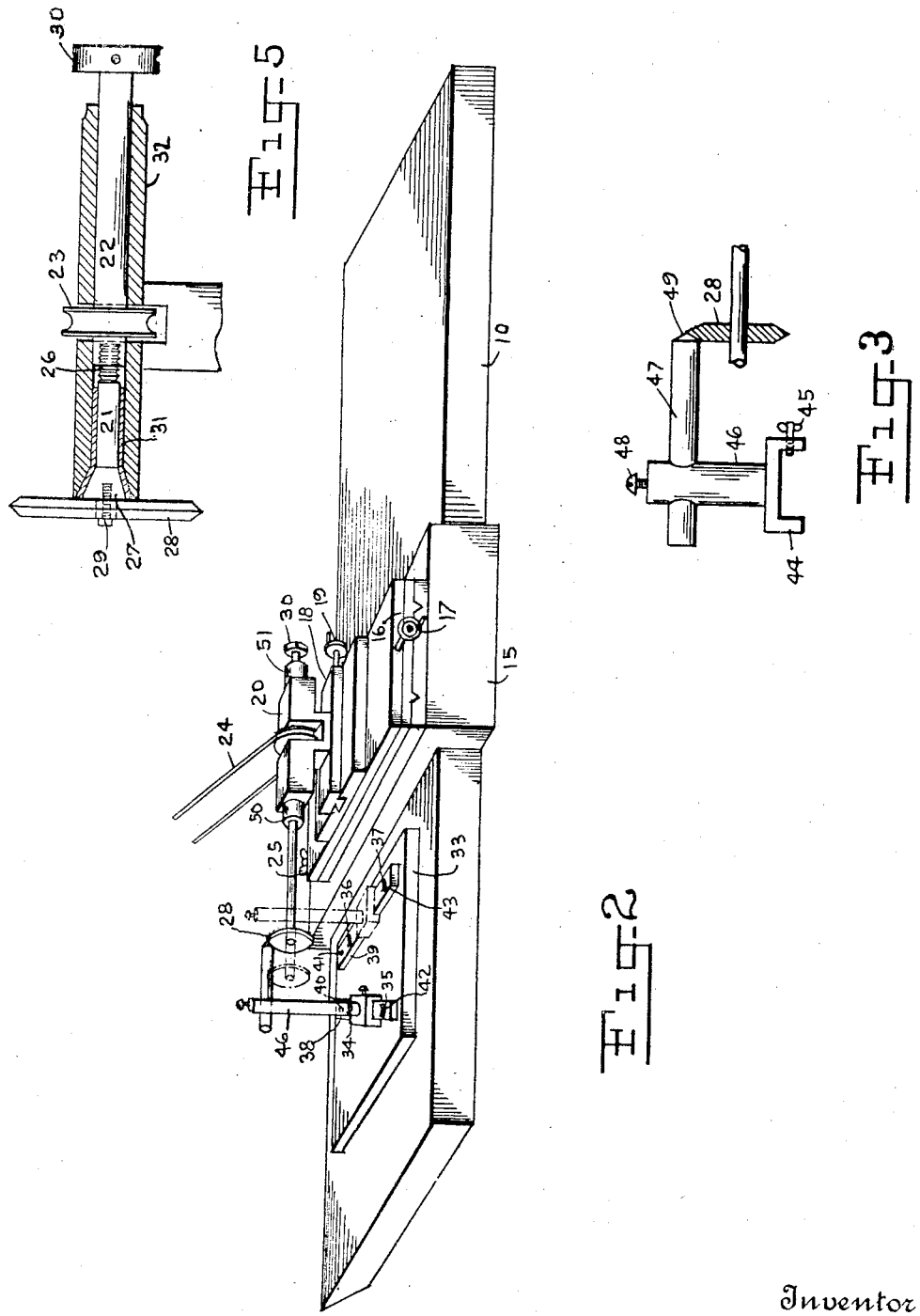

JOHN SAMOTEJ, OF NEW YORK, N. Y., ASSIGNOR OF ONE-HALF TO WITOLD SAMOTEJ, OF BROOKLYN, NEW YORK.

MANUFACTURE OF THREAD-GAGES.

1,344,607.  Specification of Letters Patent.  Patented June 22, 1920.

Application filed May 15, 1918. Serial No. 234,596.

*To all whom it may concern:*

Be it known that I, JOHN SAMOTEJ, a subject of Poland, (formerly Russian Poland,) residing at New York city, in the county of New York and State of New York, have invented certain new and useful Improvements in Manufacture of Thread-Gages, of which the following is a specification, reference being had therein to the accompanying drawing.

My invention relates to improvements in the method of and mechanism for the manufacture of standard gages such for instance as those required in the manufacture of ordnance shells. It has been customary heretofore to cut these gages upon a lathe or thread cutting machine thus involving much hand work and considerable time. According to my invention, after having first produced a master gage I can finish the gages first cut upon a thread cutting machine upon my machine by the use of this master gage, thus insuring a very perfect set of standard gages to within one ten thousandth of an inch.

Referring to the accompanying drawings, I have illustrated in Figure 1 in perspective a suitable form of simple device for finishing screw gages according to a preferred application of my invention. Fig. 2 is a similar view illustrating a preferred method for shaping up the tool for finishing the gages. Fig. 3 is an enlarged detail thereof partly in cross-section, Fig. 4 is a view on the line 4—4 looking at Fig. 1, and Fig. 5 is an enlarged detail of the cutting tool mechanism.

5 indicates a master gage which is suitably secured upon the shaft 6 which may be provided with a suitable hand wheel such as 7, said shaft mounted in the bearings 8—9, secured upon a suitable base or bench 10. 11 indicates a standard provided with an adjustable support 12 within which is mounted a gading or section of a thread member 13 adapted to engage the threads of the master gage 5. This gading is preferably of soft material such as soft brass while of course it will be understood that the master gage 5 is of steel though preferably not hardened so that it is in the most perfect condition, while at the same time sufficiently hard to resist any appreciable wear caused by the rubbing contact.

Upon the inner end of the shaft 6 is preferably suitably secured a gage 14 which has been cut upon the thread cutting machine and which has been hardened but which has yet to be finished.

15 indicates a slidable base upon the table 10 which also serves as a support for the base 16 slidable at right angles thereto and adjustable by the hand wheel 17. 18 indicates another slidable support adjustable by the hand wheel 19 at right angles thereto and carries the bearing 20 through which the spindle 21—22 passes and upon which is secured the pulley 23 which may be driven by the belt 24 from a motor or counter shaft. 25 indicates a suitable binding nut for the base 15.

Referring now more particularly to Fig. 5 it will be observed that the spindle 21 is screwed into the spindle 22 as indicated at 26, and that the outer end of the spindle 21 is provided with a shoulder 27 against which the wheel 28 may be held by any suitable means such as the screw 29. When it is desired to change the cutting tool or wheel 28 by grasping the same in one hand and the wheel 30 in the other the spindle 21—22 may be disconnected and the spindle 21 with its cutter 28 may be removed to be substituted by another which when securely locked at 26 may be readily used. 31—32 indicate the bearing and lining respectively within the support 20, and 50—51 indicate collars for holding the spindle 21—22 in position.

It will now be observed that when the cutter or finishing tool 28 has been properly adjusted with reference to the gage 14 to be finished, that by rotating the hand wheel 7 the said gage 14 will be fed with reference to the cutter 28 according to the standard cut of the thread upon the master gage 5 thereby insuring a perfect reproduction of the cut even to one ten thousandth of an inch which accuracy in the gage 14 is not disturbed thereafter as the same has been properly heat treated before said finishing operation.

Referring now more particularly to Fig. 2, it will be observed that a plate or support such as 33 may be provided with suitable holes to receive the screws 34—35 and 36—37 and that suitable blocks such as 38—39 may be secured upon said plate 33 by suitable pins such as 40—41 from which it will be seen that as the blocks 38—39 are moved upon the pivots 40—41 they may be secured permanently by the screws 34—35 and 36—37 which pass through slots such as 42—43. By referring now more particularly to Fig. 3, it will be observed that the base member 44 is adapted to be secured upon either of the blocks 38 or 39 and after having been slidably adjusted thereupon to the proper position may be secured by any suitable binding means such as the wing-nut 45. This base support provides support for the standard 46 within which the bar 47 may be secured by any suitable means such as the screw 48 said bar 47 being provided at its outer extremity with a diamond cutting point 49 for edging up the tool such as 28. In the position shown in Fig. 2 the bevel at the left side of the tool is being shaped but of course it will be readily understood that by shifting the standard 46 from the block 38 to the block 39 the right side of the tool or bevel may also be shaped as shown in dotted outline.

In finishing the gage such as 14 after it has been heat treated, I preferably first use the sand wheel and thereafter again traverse the threads with a rubber wheel of more accurate cutting angle to penetrate more accurately into spaces separating the threads. I have found that by finishing standard gages in this manner that a much more perfect and uniform result is obtained with considerably greater expedition, and at less expense than by the more arduous labor methods.

Of course it will be understood that various modifications may be made in the construction and arrangement of parts without departing from the spirit of the invention as claimed.

I claim:

1. In a device of the class described a rotatable shaft provided with means for holding and driving the work, a master gage thereon, a thread following member engaging the threads of said gage, means for turning said shaft, and a tool adapted to operate upon said work as said shaft rotates.

2. In a device of the class described a rotatable shaft provided with means for holding and driving the work, a master gage thereon, a thread following member engaging the threads of said gage, means for turning said shaft, and a tool adapted to operate upon said work as said shaft rotates, said following member of comparatively soft material.

3. In a device of the class described a rotatable shaft provided with means for holding and driving the work, a master gage thereon, a thread following member engaging the threads of said gage, means for turning said shaft, and a tool adapted to operate upon said work as said shaft rotates, said master gage not hardened and said following member of comparatively soft material.

4. In a device of the class described a rotatable shaft provided with means for holding and driving the work, a master gage thereon, a cutter to operate upon said work, means for relatively rotating said parts, a member engaging the threads of said gage said gage not hardened and said member of softer material than said gage.

5. In a device of the class described a rotatable shaft provided with means for holding and driving the work, a master gage thereon, a cutter to operate upon said work, means for relatively rotating said parts, a member engaging the threads of said gage said gage not hardened and said member of softer material than said gage, and a finishing tool adapted to be substituted for said cutter.

6. In a device of the class described, a rotatable shaft member and a rotatable cutting tool member, means for holding work upon one of said members and means for relatively rotating said members, a master gage adapted to be rotated by one of said members, a thread engaging member adapted to engage the threads of said gage, means for turning said members, and said cutting tool member adapted to operate upon said work as said members are relatively rotated.

7. The method of producing standard gages consisting in first producing a master gage, cutting another gage with the same thread, rotating both gages about the same axis, engaging said master gage in such a manner that either the engaging member or said master gage shift longitudinally, and cutting the other gage in such a manner that said other gage or its cutter move longitudinally simultaneously and proportionately with the movement of said master gage or its engaging member, said master gage unhardened and said engaging member of relatively soft material.

8. The method of producing gages consisting in first producing a gage, cutting another gage with the same thread, rotating both gages simultaneously, engaging said first mentioned gage in such a manner that either the engaging member or said first mentioned gage shift longitudinally, and cutting said other gage in such a manner that said other gage or its cutter move longitudinally simultaneously and proportionately with the movement of said first mentioned gage or its engaging member, and said first mentioned gage unhardened.

In testimony whereof I hereunto affix my signature in the presence of two witnesses.

JOHN SAMOTEJ.

Witnesses:
ANNA F. DUFFY,
THOMAS A. HILL.